C. STOLLBERG.
COVER CLOSURE FOR SHEET METAL VESSELS.
APPLICATION FILED OCT. 23, 1907.
984,614. Patented Feb. 21, 1911.
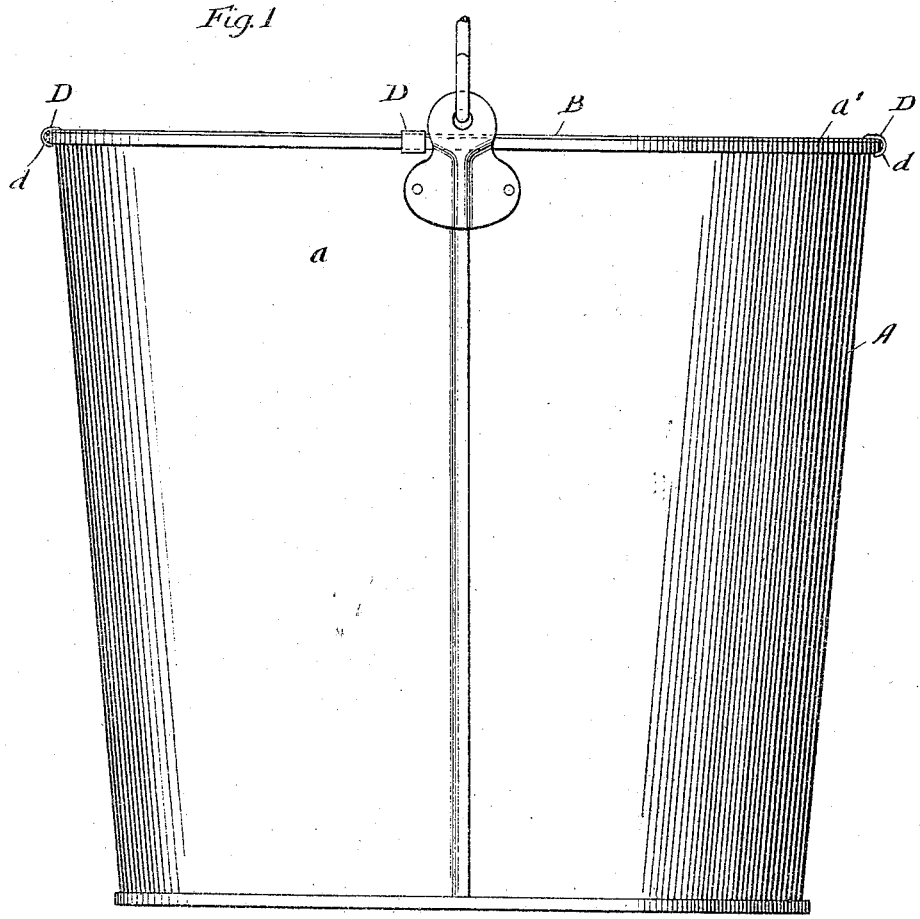
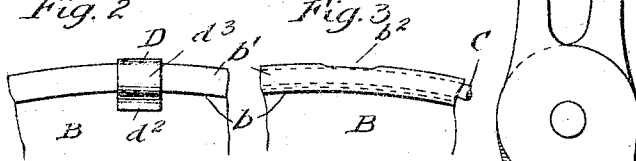
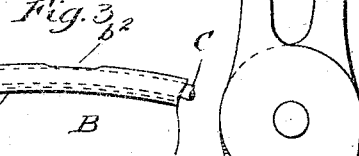
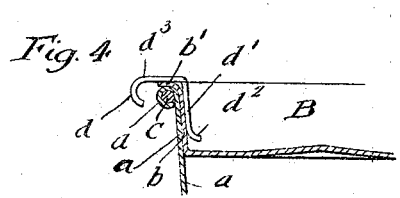
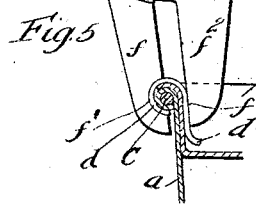
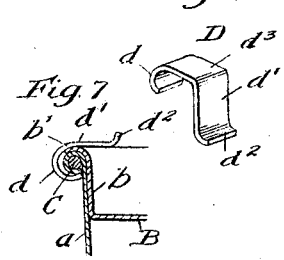
Witnesses:
Wm. Geiger
H. W. Munday
Inventor:
Charles Stollberg
By Munday, Evarts, Adcock & Clarke.
Attorneys

UNITED STATES PATENT OFFICE.

CHARLES STOLLBERG, OF TOLEDO, OHIO, ASSIGNOR TO AMERICAN CAN COMPANY, OF NEW YORK, N. Y., A CORPORATION OF NEW JERSEY.

COVER-CLOSURE FOR SHEET-METAL VESSELS.

984,614.  Specification of Letters Patent.  Patented Feb. 21, 1911.

Application filed October 23, 1907. Serial No. 398,749.

*To all whom it may concern:*

Be it known that I, CHARLES STOLLBERG, a citizen of the United States, residing in Toledo, in the county of Lucas and State of Ohio, have invented a new and useful Improvement in Cover-Closures for Sheet-Metal Vessels, of which the following is a specification.

My invention relates to closures for sheet metal pails or vessels having inside fitting removable slip covers, such as are used for containing candy, lard, grease or other articles and which are of large size or capacity and require a strong and secure fastening means for the covers, that at the same time may be readily removed and easily and conveniently applied.

The object of my invention is to provide a strong, simple and efficient means for securing slip covers on sheet metal pails or vessels which may be easily and conveniently applied to enable the vessel to be readily opened and which will safely, tightly and securely hold the cover on the vessel whatever may be its size or diameter and which will obviate the necessity of providing the cover or the body of the vessel with clenching lips or ears such as have heretofore been ordinarily secured to either the cover or the pail body either by making the same integral therewith or by soldering or riveting them thereto.

My invention consists in the means I employ to practically accomplish this object or result as herein shown and described and more particularly specified in the claims.

In the accompanying drawing forming a part of this specification, Figure 1 is a side elevation of a sheet metal pail or vessel embodying my invention, partly in vertical section. Fig. 2 is a detail plan view of a short section of the rim of the pail with a cover holding clip applied. Fig. 3 is a similar detail plan view showing the cover holding clip removed. Fig. 4 is a detail sectional view showing the cover holding clip in position ready to be applied. Fig. 5 is a detail sectional view showing the clip applied and the pincers for applying same. Fig. 6 is a detail perspective view of the cover holding clip before it is applied. Fig. 7 is a detail sectional view showing the cover holding clip partially removed.

In the drawing, A represents a sheet metal pail or vessel, such, for example, as is commonly in use for shipment of candy, lard, grease or other heavy bulky articles. The body $a$ of the pail has an external roll or shoulder $a^1$ at its upper or mouth end, ordinarily or preferably inclosing a strengthening wire C.

B is the inside fitting countersunk cover of the pail, the same having a deep friction seat wall $b$ terminating in an outwardly projecting curved flange $b^1$ which fits on top of the external roll $a$ at the upper end of the pail body, the flange $b^1$ preferably projecting slightly horizontally outward to an extent about equaling the diameter of the external roll $a^1$ of the pail body $a$.

D is a separate-piece, cover-holding, clip having a segmental circular curved outer portion $d$ fitting and embracing the external roll on the body of the vessel and a straight depending leg $d^1$ fitting flat against the friction seat wall $b$ of the countersunk cover B, said leg $d^1$ being provided at its lower end with a curved lip $d^2$ to enable a screw driver, knife blade or other like instrument to be inserted for prying off or turning up the clip D, as illustrated in Fig. 7. Before the clip D is applied to the cover and pail, it has a straight horizontal upper portion $d^3$ to enable the clip to be readily assembled on the cover and pail, as illustrated in Fig. 4, after which the clip is applied to the cover and pail by means of a pair of pincers F or other suitable tool, the outer jaw $f$ of which has a curved recess $f^1$ conforming to the curved outer segment $d$ of the clip D, and the other jaw $f^2$ of which is provided with a flat face $f^3$ to fit snugly against the straight depending leg $d^1$ of the clip. In the act of applying the clip to the cover and pail by the pincers, the straight horizontal portion $d^3$ of the clip is curved or bent snugly about the cover flange $b^1$ and external roll $a^1$ of the body as shown in Figs. 1, 2 and 5. This operation of tightening the clip on the cover is accomplished by closing the pincers, and is attended with a bending down of the projecting edge of the cover flange $b^1$ snugly against the external roll $a^1$ on the body of the vessel, and thus forming a locking bend or recess $b^2$ in the cover flange which serves to prevent the clip from slipping or moving or otherwise becoming loosened.

The clip D may be made of sheet steel or other suitable metal.

In opening the vessel or removing the cover, the circularly curved portion of the clip which embraces the external circular roll on the upper end of the vessel permits the clip to readily turn as a pivot about the circular roll to a limited extent without material binding to permit the depending leg of the clip to swing away from the upright countersunk wall of the cover far enough to enable it to be firmly grasped as a lever, and the requisite force thus applied to spring the clip from the cover. This will be readily understood from Figs. 5 and 7 of the drawing, the former showing the clip in its applied position and the latter showing it partially removed. Strong and efficient clips may thus be employed, and at the same time very easily and readily removed.

I claim:—

1. A cover closure for sheet metal vessels, comprising an external circular roll on the upper end of the vessel body, a countersunk cover fitting within the vessel body and having a friction seat wall provided with an externally projecting flange, and separate piece removable cover holding clips, each having a circularly curved outer portion embracing the cover flange and external roll of the body, curved concentrically therewith and adapted to turn thereon as a pivot in the act of removal, and provided with a straight depending leg fitting snugly against the friction seat wall of the countersunk cover, and serving as a lever to turn the clip in removing the same, the pivotal turning movement of the clip enabling its depending leg to swing away from the adjacent wall of the cover sufficiently to enable it to be grasped in the act of removal, substantially as specified.

2. A cover closure for sheet metal vessels, comprising an external circular roll on the upper end of the vessel body, a countersunk cover fitting within the vessel body and having a friction seat wall provided with an externally projecting flange, and separate piece removable cover holding clips, each having a circularly curved outer portion embracing the cover flange and external roll of the body, curved concentrically therewith and adapted to turn thereon as a pivot in the act of removal, and provided with a straight depending leg fitting snugly against the friction seat wall of the countersunk cover, and serving as a lever to turn the clip in removing the same, the horizontally projecting edge of the cover flange having a bend or depression therein at the clip to lock the clip from movement, the pivotal turning movement of the clip enabling its depending leg to swing away from the adjacent wall of the cover sufficiently to enable it to be grasped in the act of removal substantially as specified.

CHARLES STOLLBERG.

Witnesses:
LAWRENCE RAAB,
T. O. STEADMAN.